United States Patent [19]

Lytle et al.

[11] 4,161,687

[45] Jul. 17, 1979

[54] METHOD FOR LOCATING UNDERGROUND ANOMALIES BY DIFFRACTION OF ELECTROMAGNETIC WAVES PASSING BETWEEN SPACED BOREHOLES

[75] Inventors: R. Jeffrey Lytle; Darrel L. Lager, both of Livermore; Edwin F. Laine, Alamo; Donald T. Davis, Livermore, all of Calif.

[73] Assignee: The United States of America as represented by the United States Department of Energy, Washington, D.C.

[21] Appl. No.: 832,490

[22] Filed: Sep. 12, 1977

[51] Int. Cl.$^2$ .......................... G01V 3/12; G01V 3/18
[52] U.S. Cl. ................................................ 324/6
[58] Field of Search ........................................ 324/1, 6

[56] References Cited

U.S. PATENT DOCUMENTS

| | | | |
|---|---|---|---|
| 1,240,328 | 9/1917 | Fessenden | 324/1 X |
| 2,165,214 | 7/1939 | Blau et al. | 324/6 X |
| 2,659,882 | 11/1953 | Barret | 324/6 X |
| 2,901,689 | 8/1959 | Barret et al. | 324/6 |
| 3,350,634 | 10/1967 | Hoehn | 324/6 |

FOREIGN PATENT DOCUMENTS 1057519  2/1967  United Kingdom .......................... 324/6

OTHER PUBLICATIONS

Grubb et al., "Borehole Measurements . . . in the 300-KHz to 25 MHz Frequency Range"; Radio Science, vol. 11, No. 4, pp. 275-283, Apr. 1976.

Laine, Edwin F., *Short, Active, High-Frequency Antenna as an E-Field Probe*, ERDA Tech. Report No. UCR-L-77856, Abstract/Summary, pp. 1-7, Apr. 13, 1976.

Lytle et al., "Determination of the In Situ High Frequency Properties of Pemafrost Rock", Radio Science, vol. 11, No. 4, pp. 285-293, Apr. 1976.

*Primary Examiner*—Gerard R. Strecker
*Attorney, Agent, or Firm*—Dean E. Carlson; Roger S. Gaither; Clifton E. Clouse, Jr.

[57] ABSTRACT

Underground anomalies or discontinuities, such as holes, tunnels, and caverns, are located by lowering an electromagnetic signal transmitting antenna down one borehole and a receiving antenna down another, the ground to be surveyed for anomalies being situated between the boreholes. Electronic transmitting and receiving equipment associated with the antennas is activated and the antennas are lowered in unison at the same rate down their respective boreholes a plurality of times, each time with the receiving antenna at a different level with respect to the transmitting antenna. The transmitted electromagnetic waves diffract at each edge of an anomaly. This causes minimal signal reception at the receiving antenna. Triangulation of the straight lines between the antennas for the depths at which the signal minimums are detected precisely locates the anomaly. Alternatively, phase shifts of the transmitted waves may be detected to locate an anomaly, the phase shift being distinctive for the waves directed at the anomaly.

9 Claims, 7 Drawing Figures

RECEIVING ANTENNA DEPTH RELATIVE TO TUNNEL CENTER

METHOD FOR LOCATING UNDERGROUND ANOMALIES BY DIFFRACTION OF ELECTROMAGNETIC WAVES PASSING BETWEEN SPACED BOREHOLES

The invention disclosed herein was made at the Lawrence Livermore Laboratory under, or in, the course of Contract No. W-7405-ENG-48 between the U.S. Energy Research and Development Administration and the University of California.

BACKGROUND OF THE INVENTION

The present invention relates to a method that utilizes electromagnetic waves for locating underground anomalies of high electrical contrast, and more particularly it relates to the use of electromagnetic waves transmitted between adjacent boreholes to detect an anomaly therebetween by diffraction of the waves at the edges of the anomaly.

In general, prior electromagnetic methods for detecting underground anomalies have the advantages of rapidity of survey, portability of equipment and minimal destructiveness of the environment. However, these methods are surface electromagnetic methods and have been found to be insensitive for detecting anomalies of high electrical contrast at depths of more than six or seven diameters of the anomaly. Thus, heretofore, no electromagnetic method has been adequate for surveying for such anomalies on sites for large structures such as large buildings, dams and nuclear reactors, or for searching for abandoned tunnels in old mines such as in preparation for reactivating the mine.

SUMMARY OF THE INVENTION

In brief, the invention is a method for locating underground anomalies of high electrical contrast by diffraction of electromagnetic waves at the edges of the anomaly, including the steps of: drilling first and second boreholes, with the ground to be surveyed for anomalies situated between the boreholes; lowering an electromagnetic wave transmitting antenna down the first borehole first and second times; driving the transmitting antenna to transmit electromagnetic waves during the first and second lowering; lowering a receiving antenna down the second borehole first and second times in unison with the first and second lowerings of the transmitting antenna, the receiving antenna being at a first level with respect to the transmitting antenna during the first lowering and at a second level with respect to the transmitting antenna during the second lowering; detecting a distinctive variation in the waves at the receiving antenna during each of the lowerings; recording the depth of the transmitting and receiving antennas upon detection of the variation in wave reception at the receiving antenna during each of the lowerings; and triangulating the lines defined by the positions of the receiving and transmitting antennas when the distinctive variation in wave reception is detected at the receiving antenna to thereby locate the anomaly.

It is an object of the invention to accurately and rapidly detect an anomaly in a mass of material using electromagnetic waves.

Another object is to detect underground anomalies of high electrical contrast at depths greater than six diameters of the anomaly.

Another object is to detect an underground anomaly between two boreholes using only electromagnetic transmission and reception between the boreholes, a record of minimum signal intensities or phase shifts with depth, a ruler, pen and graph paper.

Another object is to detect underground anomalies using the diffraction of electromagnetic waves from the anomaly as an indication of the anomaly.

Other objects and advantageous features of the invention will be apparent in a description of a specific embodiment thereof, given by way of example only, to enable one skilled in the art to readily practice the invention which is described hereinafter with reference to the accompanying drawings.

DESCRIPTION OF AN EMBODIMENT

Figure 1:
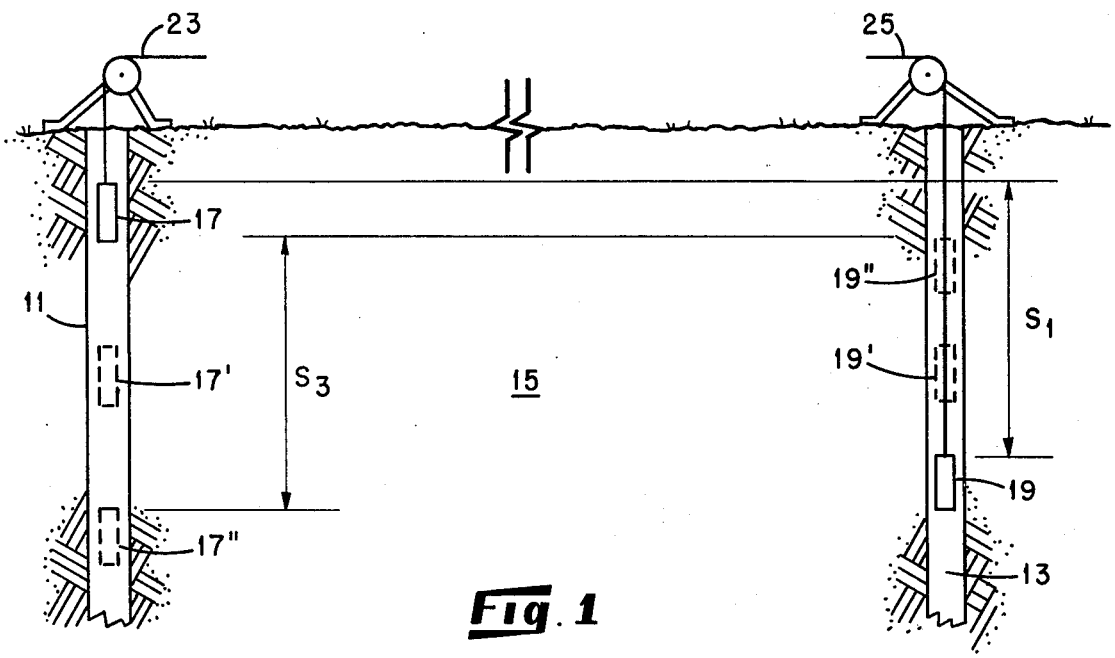
FIG. 1 is a cross-sectional view of the upper portions of two boreholes, showing a transmitting antenna in one borehole and a receiving antenna in the other, both at various relative levels, for surveying the ground between the boreholes for an anomaly, according to the invention.

Referring to the drawing there is shown in FIG. 1 a cross-sectional view of the upper portion of a borehole 11 and borehole 13 which were drilled with ground 15 to be surveyed located between the boreholes. In carrying out the survey, a transmitting antenna 17 is lowered down the borehole 11 in unison with the lowering of a receiving antenna 19 down the borehole 13. The antennas are lowered in unison a plurality of times, but at different relative levels. For example, the first lowering in unison may be with the antennas 17 and 19 at levels separated a length $s_1$ during the entire lowering; the second lowering may be with the antennas at the same level, such as in positions 17' and 19 during the lowering; the third lowering may be with the antennas separated a length $s_3$ during the lowering, such as in positions 17'' and 19''. The differential levels discussed are only illustrative of the possible ones that may be used in lowering the antennas.

Figure 2:
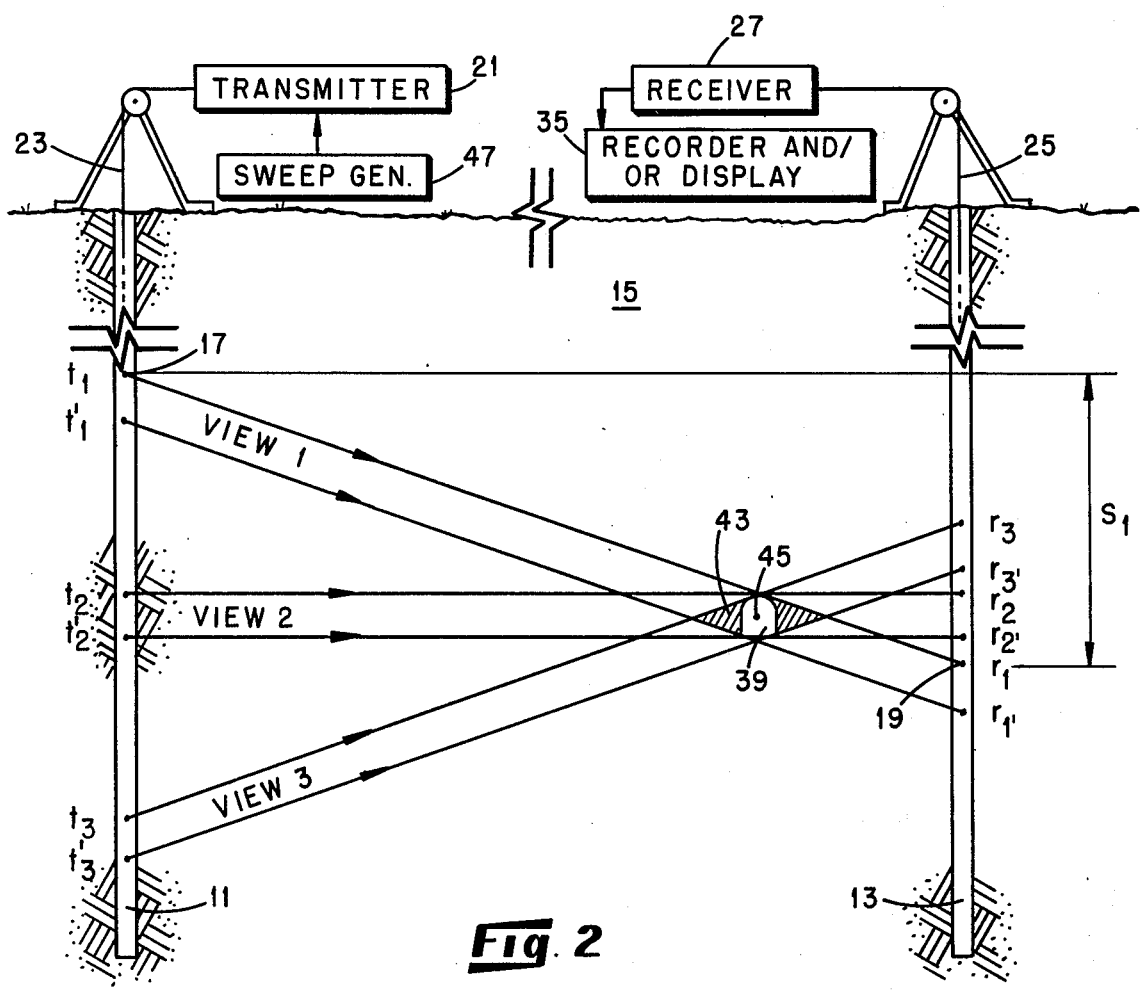
FIG. 2 is a cross-sectional view of the boreholes of FIG. 1 at greater depth and illustrates triangulation from recorded signals and antenna depth to locate the anomaly.

In performance of the method, to search for anomalies of high electrical contrast between the boreholes 11 and 13, electromagnetic signals of stable frequency and constant amplitude are applied to the antenna 17 by means of a transmitter 21 (FIG. 2) over a cable 23 as the antenna 17 is lowered in unison with the antenna 19 but at levels separated a length $s_1$. The transmitted electromagnetic signals may be transmitted continuously or at intervals of depth. The signals are received by the antenna 19 and transmitted over a cable 25 to a receiver 27 for recording and/or display.

Figure 3A:
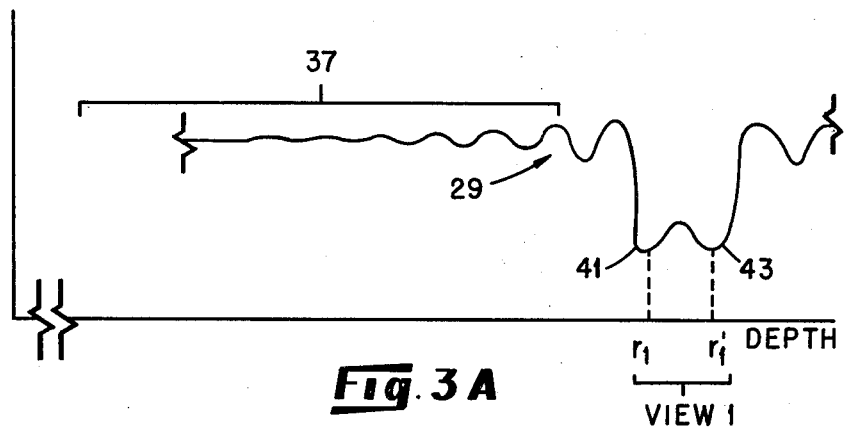
FIGS. 3A, 3B and 3C, are a set of representative curves of signal intensity at the receiving antenna of FIGS. 1 and 2 as a function of receiving antenna depth during successive lowerings of the antennas.
Figure 3B:
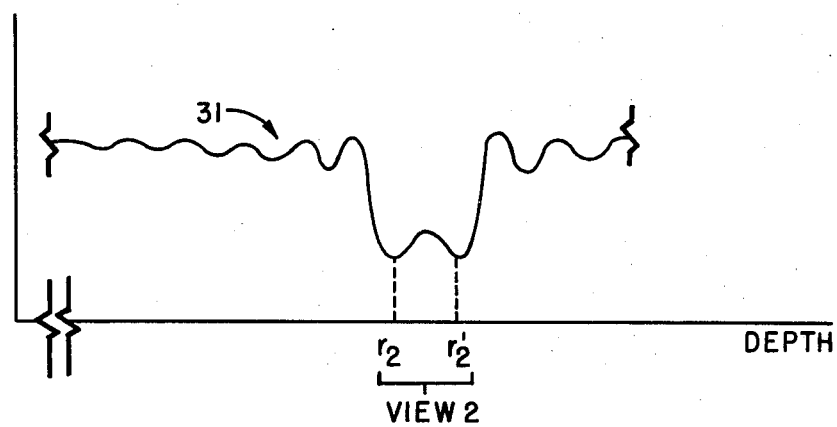
Figure 3C:
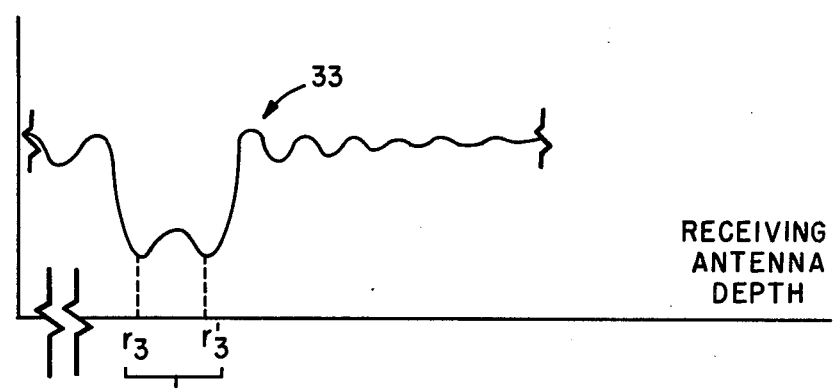

Representative curves 29, 31, and 33, of signal intensity at the receiving antenna as a function of the depth of the receiving antenna during successive lowerings are shown in FIGS. 3A, 3B, and 3C, and are developed from the displayed information. For example, the curve 29 may be developed by lowering the antennas 17 and 19 in unison down their respective boreholes 11 and 13 but separated in the vertical direction the length $s_1$. As the antennas are lowered the signal intensity received at the antenna 19 is recorded and/or noted from a signal display at a recorder-display station 35. Initially the signal intensity has a high average intensity as represented by a portion 37 of the curve 29. However, when the antennas 17 and 19 are lowered to positions $t_1$ and $r_1$ respectively, a straight line between the antennas intersects the upper edge of an anomaly such as a tunnel 39. With the antennas so positioned, the signals transmitted from the antenna 17 that otherwise would be received with a high average intensity at the antenna 19 are diffracted away from the antenna 19 so that a signal of minimum intensity, indicated at 41 of the curve 29, is received. Upon further lowering of the antennas 17 and 19 to the positions $t_1'$ and $r_1'$ respectively, another signal of minimum intensity, indicated at 43 of the curve 29, is received. The depths at which these minimum signals are received may be automatically recorded or simply noted by observation. In either case, this information may be used to construct a view 1 of the tunnel 39 with one defining line drawn from the depth of the antenna 17 at $t_1$ to the depth of the antenna 19 at $r_1$ when the first minimum signal is received and another defining line drawn from the depth of the antenna 17 at $t_1'$ to the depth of the antenna 19 at $r_1'$ when the second minimum signal is received. Information to construct defining lines for additional views, for example, views 2 and 3 (FIG. 2), may be obtained during subsequent lowerings of the antennas 17 and 19 in a similar manner. The information for view 2 is obtained by lowering the antennas in unison, with no vertical separation, to provide points for the curve 31 (FIG. 3B) with signal minimums at receiver depths of $r_2$ and $r_2'$. In a similar manner, information for the view 3 may be obtained by lowering the antennas 17 and 19 in unison, with a vertical separation of length $s_3$, to provide points for the curve 33 with signal minimums at receiver depths of $r_3$ and $r_3'$. Triangulation of the views gives a central area 43 within which, it may be deduced, that the tunnel 39 exists with a center at 45. Additional views may be developed in a similar manner for greater accuracy.

Figure 4:
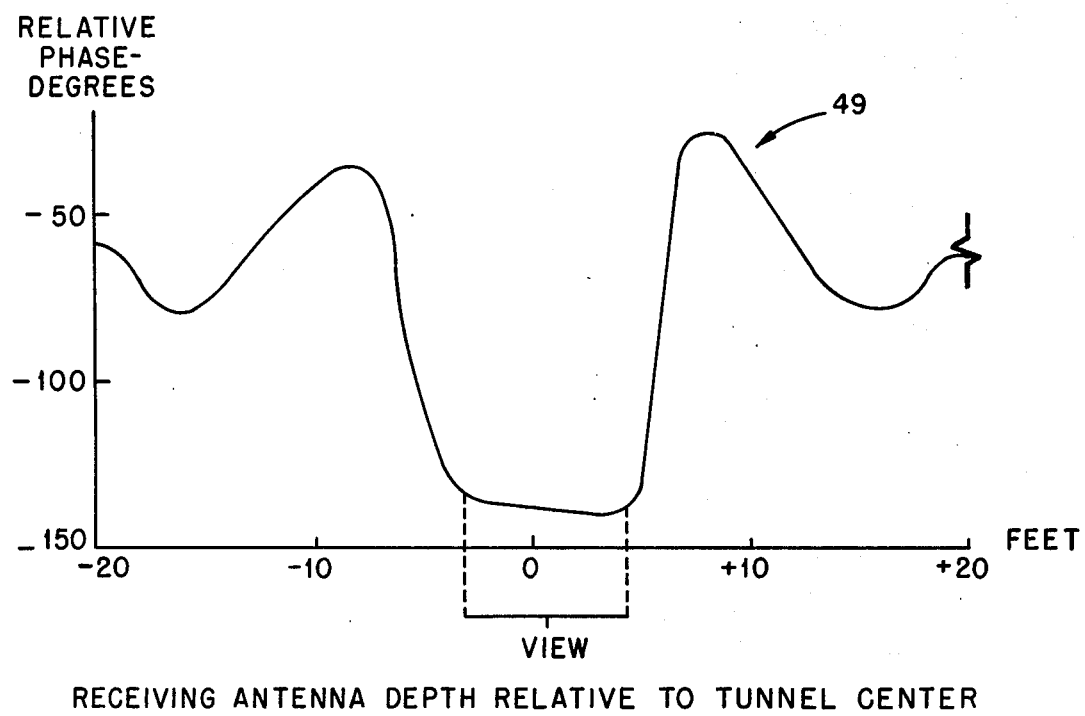
FIG. 4 is a representative curve of phase shift of electromagnetic signals in the vicinity of an anomaly.

Alternatively, the phase of the received signals may be compared to a reference delay of the signals to locate an anomaly. It has been found that there is a sudden increase in lag of phase angle of the received signals when an edge of an anomaly intersects a straight line between the antennas. A representative curve 49 is shown in FIG. 4 and indicates the phase angle of received signals at the receiving antenna 19 relative to an anomaly. The curve 49 is similar in shape to the curves 29, 31 and 33, discussed hereinbefore, and subject to similar interpretations. By lowering the antennas 17 and 19 in unison a plurality of times, several such curves with views, as discussed before, may be developed. From this information, triangulation of the views may be performed to accurately determine the location of the anomaly.

Figure 5:
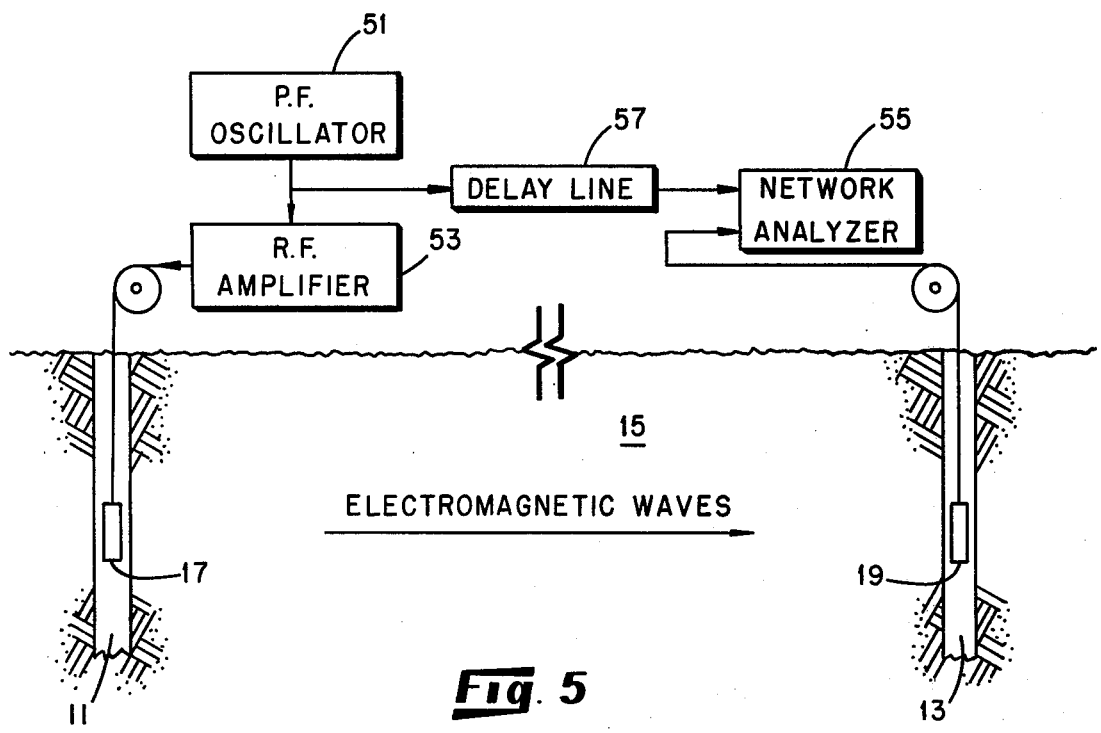
FIG. 5 is a block diagram of an electronic system for deriving the curve of FIG. 4 for surveying the ground between a pair of boreholes for an anomaly be measurement of the phase shift of electromagnetic signals transmitted from one borehole to the other.

A block diagram of an electronic system for developing the information for curve 49 is shown in FIG. 5. Electromagnetic signals are generated in an oscillator 51 for amplification in an amplifier 53 for transmission to the transmitting antenna 17 and propagation through the earth 15 to the receiving antenna 19 and a network analyzer 55. The phase of the transmitted signals is compared in the network analyzer to signals having a reference delay and which are applied from the oscillator 51 to the analyzer 55 through a delay line 57 to develop the delay. The delay for the reference signals is made equal to the time for transmission of an electromagnetic wave from the oscillator 51 to the amplifier 53, the antenna 17, through homogeneous earth 15 to the antenna 19 and analyzer 55. The delay may be provided by inserting a transmission line that is cut to a length that is calculated for the delay. As indicated in FIG. 4, a typical delay results in an average phase difference of 50 degrees between the transmitted signals and the reference signals when no anomaly is between the antennas. All such phase differences may be viewed directly on the network analyzer. When the antennas are lowered to a position such that an anomaly lies therebetween, the delay of the transmitted signal as compared to the reference signal increases sharply as indicated in FIG. 4, whereby providing information for accurately locating the anomaly as discussed hereinbefore.

It has been found that for good accuracy, the wavelength of the transmitted signals should be no more than one half of the diameter of the anomaly to be detected. Thus, where the diameter of the expected anomaly cannot be accurately anticipated, it is preferable to sweep the frequency of the transmitted signals during each lowering of the antennas 17 and 19. A sweep generator 47 therefore may be used to modulate the transmitter 21 whereby the transmitted signals are swept over a range of frequencies which can be used to detect anomalies of expected significance. Since such sweeping can be done very rapidly, lowering of the antennas 17 and 19 in unison can be carried out as described hereinbefore for single frequency signals. Received signal minimums will be detected as described before for use in constructing views that may be triangulated to locate the anomaly.

It has also been found that the electrical contrast between the anomaly to be detected and the surrounding medium should be in the ratio of 3 or more or less than one-third to provide definite detectable variations. The measure of the contrast is made by ratioing the dielectric constant or the conductivity of the anomaly and the medium.

The undulatory nature of the signal intensity received at the antenna 19 as shown in FIGS. 3A, 3B, and 3C is noted and is believed to be due to interference between signal transmissions over the natural terrain between the boreholes and signal diffractions from the top and bottom of the high-contrast anomaly.

In actual performance of the method of the invention, an existing 80 foot deep, 5 foot diameter tunnel in granite at Gold Hill, Colorado, was located both horizontally and vertically within three feet of its surveyed location. Various frequencies were tried, and a frequency of 57 MHz was found to give accurate results for the Gold Hill location between boreholes spaced up to 80 feet apart. The 57 MHz frequency penetrated well and gave good definition. In general, high frequencies give good definition but do not penetrate the earth adequately, while low frequencies penetrate the earth well, but do not provide good definition. The transmitting antenna used at Gold Hill was a quarter-wave sleeve dipole such as described by H. Jasik, *Antenna Engineering Handbook*, McGraw-Hill, 1961, pages 3-17 and 3–18, which is incorporated herein by reference. Sample transmissions around 1 watt were made at 2-foot vertical intervals. The receiving antenna was of the type described by Edwin F. Laine in his paper entitled *Short, Active High-Frequency Antenna As An E-Field Probe,* Lawrence Livermore Laboratory, University of California, Livermore, Calif., USERDA technical report no. UCRL-77856, which is incorporated herein by reference.

For additional details of the Gold Hill experiment and for a more theoretical discussion of the invention reference is made to: USERDA technical report no. UCRL-52166, Lytle, Lager, Laine and Davis, *Using Cross-Borehole Electromagnetic Probing To Locate A Tunnel,* Lawrence Livermore Laboratory, University of California, Livermore, Calif.; and to USERDA technical report no. UCRL-52214, Davis, Lytle, Lager and Laine, *Analysis of Electromagnetic Wave Probing For Underground Voids,* Lawrence Livermore Laboratory, University of California, Livermore, Calif., both of which reports are incorporated herein by reference.

Reference is also made to a paper by Lytle, Laine, Lager and Okada, "Determination of the in situ high frequency electrical properties of permafrost rock", Radio Science, Volume II, Number 4, pages 285–293, April 1976, wherein borehole-to-borehole electromagnetic wave transmission techniques are disclosed for analysis of some electrical properties of the intervening terrain. This report also is incorporated herein by reference to show transmitting and receiving antennas and electronics that could be used in practicing the invention.

While an example of the method of the invention has been shown and described, further examples of the invention will be apparent to those skilled in the art without departing from the spirit of the invention. For example, the mass of material to be examined for an anomaly may be other than underground such as manmade archeological ruins in which it is desired to determine internal unknown structure.

What we claim is:

1. A method for locating an anomaly of high electrical contrast within a medium by diffraction of electromagnetic waves at the edges of said anomaly, including the steps of:
   drilling first and second boreholes, with the medium to be surveyed for anomalies situated between the boreholes;
   lowering an electromagnetic wave transmitting antenna down the first borehole first and second times;
   driving said transmitting antenna to transmit electromagnetic waves during said first and second lowerings, the frequency of said electromagnetic waves being within the range of 15–120 MHz;
   lowering a receiving antenna down said second borehole first and second times in unison with said first and second lowerings of said transmitting antenna, said receiving antenna having a first vertical separation from the transmitting antenna during said first lowering and a second vertical separation from the transmitting antenna during said second lowering;
   detecting variations of the waves at the receiving antenna during each of said lowerings, said variations being undulatory over a wide range of depth during said lowerings as the antennas approach an anomaly, said undulations being distinctly different when the anomaly is in a direct path between the anetnnas due to diffraction of said waves away from said receiving antenna due to diffraction of said waves away from said receiving antenna;
   recording the depth of said transmitting and receiving antennas upon reception at the receiving antenna of a distinctive variation in the undulations of the waves during each of said lowerings; and
   triangulating the lines defined by the positions of said receiving and transmitting antennas upon reception of said distinctive wave variations at the receiving antenna, to thereby locate the anomaly.

2. The method of claim 1, wherein said transmitting antenna is driven to transmit electromagnetic waves from said transmitting antenna at intervals of depth during said lowering of said transmitting antenna.

3. The method of claim 1, wherein said transmitting antenna is driven to transmit electromagnetic waves continuously during said lowering of said transmitting antenna.

4. The method of claim 1, wherein said transmitting antenna is driven at a constant frequency during said lowering.

5. The method of claim 1, further including driving said transmitting antenna to sweep over a range of frequencies during said lowering of said transmitting antenna to provide at least one frequency of electromagnetic waves that will be sharply diffracted at the edges of the anomalies to be detected.

6. The method of claim 1, wherein said transmitting antenna is driven at a frequency providing an electromagnetic wavelength that is no more than one half of the diameter of the expected anomaly to be detected.

7. The method of claim 1, wherein the variations detected at said receiving antenna are signal intensity variations and said distinctive variation is a minimum signal intensity.

8. The method of claim 1, further including the step of generating a reference signal, and wherein the variations detected at said receiving antenna are variations in phase, with respect to said reference signal, and said distinctive variation is an increase in lag of said waves with respect to said reference signal.

9. The method of claim 1, wherein the electrical contrast between the anomaly to be detected and the surrounding medium is in the ratio of greater than 3 or less than $\frac{1}{3}$.

* * * * *